(12) United States Patent
Becker

(10) Patent No.: US 6,308,685 B1
(45) Date of Patent: Oct. 30, 2001

(54) METHOD AND DEVICE FOR THE TRANSIENT OPERATION OF AN INTERNAL COMBUSTION ENGINE, IN PARTICULAR FOR A MOTOR VEHICLE

(75) Inventor: Ruediger Becker, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/519,161

(22) Filed: Mar. 6, 2000

(30) Foreign Application Priority Data

Mar. 6, 1999 (DE) .............................................. 199 09 955

(51) Int. Cl.$^7$ ...................................................... F02M 7/00
(52) U.S. Cl. ............................................ 123/456; 123/447
(58) Field of Search ................................... 123/456, 446, 123/447, 357, 486, 480, 497

(56) References Cited

U.S. PATENT DOCUMENTS

| 4,777,921 | 10/1988 | Miyaki et al. ........................ 123/456 |
| 5,950,598 | * 9/1999 | Wenzlawski et al. ................ 123/435 |
| 6,085,727 | * 7/2000 | Nakano ................................. 123/447 |
| 6,092,507 | * 7/2000 | Bauer et al. .......................... 123/430 |

* cited by examiner

*Primary Examiner*—Henry C. Yuen
*Assistant Examiner*—Mahmoud Gimie
(74) *Attorney, Agent, or Firm*—Kenyon & Kenyon

(57) ABSTRACT

Method and device for operating an internal combustion engine for a motor vehicle, in which fuel is delivered under pressure by a delivery pump to a pressure chamber. The pressure acting upon the fuel in the pressure chamber is measured, and the fuel is injected by an injection valve directly into a combustion chamber of the internal combustion engine from the pressure chamber as a function of the measured pressure acting upon the fuel. When varying the working point of the internal combustion engine with regard to the pressure acting upon the fuel, it must be possible to control injection as accurately as possible even within the transient range, thus providing a sufficiently comfortable driving performance even within the transient ranges. This is achieved, in particular, in that the actual pressure acting upon the fuel is computed within the transient range and the working point of the internal combustion engine is adjusted correspondingly to this pressure.

17 Claims, 1 Drawing Sheet

METHOD AND DEVICE FOR THE TRANSIENT OPERATION OF AN INTERNAL COMBUSTION ENGINE, IN PARTICULAR FOR A MOTOR VEHICLE

FIELD OF THE INVENTION

The present invention relates to a method and device for a transient operation of an internal combustion engine.

BACKGROUND INFORMATION

In vehicle engines with direct fuel injection, e.g. diesel engines or the recently developed direct injection gasoline engines, the fuel is compressed to a certain pressure in a pressure chamber and then distributed by injection valves to the individual combustion chambers. A constant fuel pressure is maintained, depending on the conditions.

In the case of direct gasoline injection (DGI), however, the fuel pressure takes on a greater significance because it is largely responsible for the quality of fuel preparation during injection as well as the depth of fuel penetration into the combustion chamber. To utilize the full potential of an internal combustion engine with direct gasoline injection, particularly in "stratified charge mode"—in which the fuel in the combustion chamber is distributed within channels or strata—different fuel pressures are set, depending on the working point. The fuel pressure is usually varied as a function of the load applied to the internal combustion engine as well as speed. This produces a transient change from one pressure level to another pressure level.

In contrast to the spark-ignition engine, in which a relatively constant pressure is applied to the fuel, the fuel pressure in direct-injection diesel or gasoline engines is set between approximately 40 bars and 120 bars. depending on the working point. In a direct-injection gasoline engine, the working points correspond, for example to the above-mentioned stratified charge mode, a homogeneous mode, or an idle mode.

A further operating parameter is the injection geometry selected for the injection nozzles, or rather the role it plays in the penetration geometry of the fuel injected into the combustion chamber.

Because this geometry and the injection nozzle properties are assumed to be constant, the injection geometry, i.e. the detailed variation of fuel in the combustion chamber, is almost entirely dependent on the fuel pressure present at the injection nozzle.

In conventional internal combustion engines, for example the diesel injection engine described in U.S. Pat. No. 4,777,921, the fuel is supplied by a high-pressure pump to a pressure chamber, referred to as a "fuel rail". The pressurized fuel is then injected into combustion chambers from the pressure chamber by electrically driven injection valves according to the prevailing operating conditions in the internal combustion engine. The high-pressure pump is also driven by a control unit according to the prevailing operating conditions.

Due to cost and space constraints, the high-pressure pump is now becoming ever more compact. In contrast to this trend, the pressure chambers have a tendency to increase in capacity. since this inhibits, in particular, the formation of vapor bubbles in the pressurized fuel during hot operation or hot start. The main reason for this in particular is that a large-volume pressure chamber that extends almost all the way to the cylinder heads of the combustion chambers effectively prevents bubbles from forming in the pressure chamber area close to the cylinder head as a result of fuel convection. This increasingly prolongs the pressure buildup times needed in the pressure chamber due to necessary changes in fuel pressure. As a result, erroneous deviations from the desired pressure occur temporarily.

In the above-mentioned internal combustion engines with direct gasoline injection, the working points are subject to constant changes, which means that these engines are continuously within the transient range. Due to nitrogen oxide conversion, for example, the engine is constantly switching back and forth between homogeneous and stratified charge mode. In particular, this changeover is independent of the specific driver request. To this are added changes in the working point that are caused by new driver requests.

SUMMARY OF THE INVENTION

The present invention relates to a method and device for operating an internal combustion engine, in particular for a motor vehicle, in which fuel is delivered by a delivery pump to a pressure chamber where a corresponding pressure acting upon the fuel builds up. The pressure acting upon the fuel in the pressure chamber is measured. The fuel is injected by at least one injection valve directly into a combustion chamber of the internal combustion engine from the pressure chamber as a function of the measured pressure acting upon the fuel. The working point of the internal combustion engine changes upon a transition from a first pressure acting upon the fuel to a second pressure acting upon the fuel. The present invention also concerns a corresponding control unit for an internal combustion engine.

The object of the present invention is therefore to provide a method for operating an internal combustion engine as well as a corresponding internal combustion engine in which injection is controlled as accurately as possible even within the transient ranges. Another object is to provide a sufficiently comfortable driving performance even within the transient ranges, for example, avoiding momentary jolts due to the fact that the fuel pressure in the pressure chamber was not predicted or assumed with sufficient accuracy. In addition, the internal combustion engine must comply with legislated exhaust emission requirements even when operating within a transient range.

This object is achieved by the method according to the present invention in that the pressure acting upon the fuel is computed within the transient range between the first and the second pressures acting, upon the fuel in the pressure chamber, and the working point of the internal combustion engine is adjusted correspondingly to the actual pressure acting upon the fuel. According to the method, it is thus possible to set a fuel pressure according to need by predicting the actual value of the fuel pressure in the pressure chamber. Knowledge of this fuel pressure is then used to adjust the present working point of the internal combustion engine to this actual value. This ensures that the internal combustion engine remains fully controllable even when operating within a transient range as described above and can thus operate at the optimum working point even within this range.

According to one embodiment of the present invention, the method according to the present invention enables the pressure acting upon the fuel to be derived in each case on the basis of a model calculation. A model calculation of this type enables the fuel pressure to be determined with a relatively high degree of accuracy even within the transient range, thus allowing the corresponding working point of the internal combustion engine to be set with the same degree of accuracy.

According to a preferred embodiment of the method according to the present invention the actual pressure acting upon the fuel within the transient range can be derived from a variation over time in the pressure buildup and pressure release, respectively, using the input quantities of the first and second pressures acting upon the fuel, the delivery volume of the delivery pump, and the volume of the pressure chamber. The existing pressure buildup and pressure release, respectively, within the transient range can thus be modeled correspondingly on the basis of the difference between the first and second pressures acting upon the fuel. This requires a known delivery volume of the delivery pump and also generally represents a function that is dependent on the internal combustion engine speed. The volume of the pressure chamber must also be provided as a fixed quantity.

According to a further embodiment of the method according to the present invention, the determination of the actual pressure acting upon the fuel within the transient range can also take into account the pressure release caused by the fuel mass injected from the pressure chamber into the combustion chamber. Assuming a relatively large pressure chamber volume the pressure release due to a fuel mass injected into the combustion chamber represents a secondary effect, which can thus be used as a secondary correcting factor to set the exact working point of the internal combustion engine more accurately.

With the method according to the present invention, the working point of the internal combustion engine can also be adjusted to the actual pressure acting upon the fuel within the transient range by varying at least one combustion-related parameter. Adjusting the working point of the internal combustion engine in this corresponding manner can be accomplished, for example, by varying the position of a throttle valve provided for the internal combustion engine; adjusting the respective opening and closing speeds of the throttle valve; varying a swirl valve provided for the internal combustion engine; varying a provided exhaust gas recirculation; varying an ignition means of one or more cylinders in the internal combustion engine; varying the contents of the combustion chamber; or varying the composition of the injected fuel mixture. By coordinating the parameters over time, it is possible for example, to set the throttle valve and contents, respectively, so that they correspond to the fuel pressure even within the transient range. This makes it possible to improve the driving performance, in particular the driving comfort, of the internal combustion engine and lower emissions from the combustion chambers following combustion.

Finally, the method according to the present invention makes it possible for the adjustment of the working point of the internal combustion engine to the actual pressure acting upon the fuel in the pressure chamber within the transient range to take into account an injection geometry that is dependent on the actual pressure acting upon the fuel. The combustion conditions prevailing in the combustion chamber are highly dependent on the geometry of the injection nozzle used, and, in particular, on the fuel pressure present at the injection nozzle, i.e. the pressure at which the fuel is injected, i.e. sprayed, into the combustion chamber. As a result, the model calculation proposed according to the present invention can take into account these geometric effects when adjusting the working point to the prevailing fuel pressure.

In the case of the control unit provided in particular for an internal combustion engine according to the present invention, the present object is achieved in particular by providing processor means for determining the actual pressure acting upon the fuel within the transient range between the first and the second working points. According to one embodiment of the processor means, the actual pressure acting, upon the fuel within the transient range between the first and the second working points can be derived on the basis of a model calculation from a variation over time in the pressure buildup and pressure release, respectively, using the input quantities of the first and second pressures acting upon the fuel, the delivery volume of the delivery pump, and the volume of the pressure chamber.

According to a further embodiment of the control unit, the control means for adjusting the working point of the internal combustion engine to the actual pressure acting upon the fuel within the transient range can have means for varying at least one combustion-related parameter. The control means can thus be used to adjust the working point of the internal combustion engine by varying the position of a provided throttle valve; adjusting the respective opening and closing speeds of the throttle valve; varying a swirl valve provided for the internal combustion engine; varying a provided exhaust gas recirculation; varying the ignition angle of one of the cylinders of the respective combustion chambers; varying the contents of the combustion chamber; or varying the composition of the injected fuel mixture.

DETAILED DESCRIPTION

Figures 1, 2:
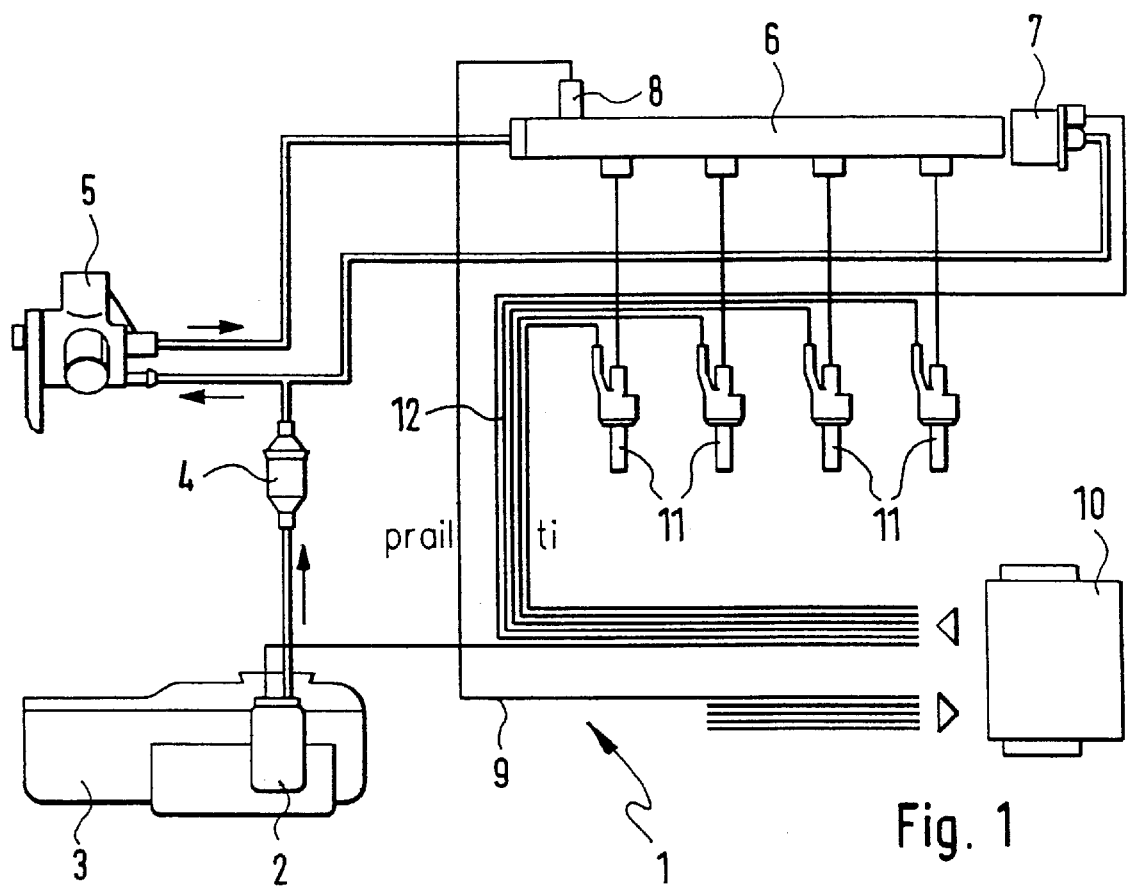
FIG. 1 shows a block diagram of an internal combustion engine according to the present invention.
FIG. 2 shows an example of a fuel pressure variation over time within a transient range according to the present invention.

FIG. 1 shows one embodiment of an internal combustion engine according to the present invention. In particular, FIG. 1 illustrates a fuel delivery system 1 of an internal combustion engine that is provided for use in a motor vehicle. The internal combustion engine has four cylinders and therefore also four combustion chambers. According to this embodiment of the internal combustion engine, the fuel, preferably gasoline, is injected directly into the combustion chambers.

The fuel is transported by a predelivery pump 2 from a container 3 via a filter 4 to a main delivery pump 5 which pumps the fuel into a pressure chamber 6. With the help of pumps 2, 5 a relatively high pressure acting upon the fuel is present in pressure chamber 6. Connected to pressure chamber 6 are a pressure control valve 7 and a pressure sensor 8, the latter can be used to measure the pressure present in pressure chamber 6 and acting upon the fuel. Pressure sensor 8 generates an electric signal PRAIL, which corresponds to the measured pressure and is applied by an electric control unit 10 via a line 9. With the help of pressure control valve 7 and pressure sensor 8, the pressure in pressure chamber 6, i.e. the pressure acting upon the fuel, can be adjusted by control unit 10 to a high and more or less constant output value.

Control unit 10 is a programmable microprocessor that includes storage devices and other necessary components and is installed in the motor vehicle. Control unit 10 receives the signals needed to carry out the method. among other things from sensors such as pressure sensor 8. generating from these signals, according to the described method, the signals needed to drive elements such as actuators, e.g. for driving injection valves 11 or pressure control valve 7.

Four injection valves 11 are connected to pressure chamber 6. Each of injection valves 11 is assigned directly to one combustion chamber in the internal combustion engine. When closed, injection valves 11 cut off pressure chamber 6 from the corresponding combustion chamber. Injection valves 11 are connected to control unit 10 via electric lines 12. To drive one of injection valves 11, control unit 10 generates an electric signal ti that is used to open the corresponding injection valve. The length of signal ti corresponds to the injection time during which fuel is injected by corresponding injection valve 11 from pressure chamber 6 to the corresponding combustion chamber of the internal combustion engine.

The pressure variation acting upon the fuel in pressure chamber 6, as shown in FIG. 2, is used to increase the pressure from actual value P1 to setpoint P2. A pressure change of this type occurs almost constantly during the normal operating cycle of a direct-injection gasoline engine, i.e. especially at the end of the start phase, for example when changing between homogeneous and stratified charge mode as described above. In internal combustion engines of this type, this pressure is preset as a function of the working point of the internal combustion engine, using control unit 10 shown in FIG. 1. The working point is thus highly dependent on the load acting upon the internal combustion engine, the prevailing speed, or the different combustion modes, e.g. stratified charging. homogeneous or idle mode.

The pressure rise from P1 to P2 occurring within the transient range would follow line $P_{ideal}$ under ideal conditions, i.e. with a relatively high delivery rate of delivery pump 5 and a relatively low volume of pressure chamber 6. With regard to the operating conditions of internal combustion engine 1, for example, pressure point P1 can be a homogeneous mode, while pressure point P2 can be a stratified charge mode. As further illustrated in FIG. 2, the pressure variation within the transient range represents a value other than ideal curve $P_{ideal}$ under real conditions. This difference is derived, in particular, from the real conditions for delivering fuel to pressure chamber 6. for example the generally limited delivery rate of delivery pump 5 and the relatively large volume of pressure chamber 6. In the present instance, these real conditions mean that the real pressure rise lags in time behind the ideal pressure rise.

According to the present invention, real pressure variation $P_{real}$ is predicted within the transient range on the basis of a model calculation. In the underlying model, high-pressure pump 5 is viewed as the actuator and pressure chamber 6 (fuel rail) as the accumulator. In addition, the general validity of gas equation p×V=const. (for constant temperatures) is assumed in relation to the fuel pressure. Overall, this yields the following equation:

$$\frac{dp}{dt} \sim \frac{dV_{p1,p2}}{dt} \sim \qquad (1)$$

$$\frac{dV^{max,pump}}{dt}(\mu) \cdot \frac{1}{V_{fuelrail}} - \sum \frac{dV}{dt} (\text{injection/transient})$$

$$\frac{p_2 - p_1}{p_1} = \frac{\dot{V}_{pump}}{V_{fuelrail}} \cdot \Delta t - \frac{\sum\limits_{injection/transient} \Delta V}{V_{fuelrail}} \qquad (2)$$

This model, therefore provides a pressure difference $\Delta_{p1,p2}$ and calculates from these values the fuel pressure that is present in the pressure chamber at a given time.

Based on pressure values $P_{real}$ determined in this manner, the working points of the internal combustion engine that have been adjusted to the real pressure conditions can now be coordinated, i.e. set. Corresponding working point variations can be carried out, for example, by adjusting the throttle valve, thereby setting the composition of the total air/fuel mixture injected into the combustion chamber. Alternatively, the exhaust gas recirculation provided with the presence of a catalytic converter can be used to prepare the mixture accordingly. In addition, the working point can be adjusted by varying the ignition angle of the piston movement occurring during combustion.

A particularly important feature is the implementation of the method according to the present invention in the form of a control element that is provided for a control unit of an internal combustion engine, in particular for a motor vehicle. The control element stores a program that can run on a computing unit, in particular a microprocessor, and is suitable for carrying out the method according to the present invention. In this case, therefore, the present invention is implemented by a program stored on the control element, so that this control element provided with the program represents both the present invention and the method, with the program being suitable for carrying out the method. In particular, an electrical storage medium, such as a read-only memory, can be used as the control element.

What is claimed is:

1. A method for operating an internal combustion engine, comprising the steps of:

using a delivery pump, delivering a fuel to a pressure chamber to build up a pressure acting upon the fuel;

determining the pressure acting upon the fuel in the pressure chamber within a transient range, the transient range being between a first pressure acting upon the fuel in the pressure chamber and a second pressure acting upon the fuel in the pressure chamber;

injecting the fuel by at least one injection valve from the pressure chamber directly into a combustion chamber of the internal combustion engine as a function of the determined pressure; and adjusting a working point of the internal combustion engine upon a transition from the first pressure to the second pressure as a function of the determined pressure.

2. The method according to claim 1, wherein a motor vehicle includes the internal combustion engine.

3. The method according to claim 1, further comprising the step of:

determining the pressure acting upon the fuel in each case as a function of a model calculation.

4. The method according to claim 3, further comprising the step of:

determining the pressure acting upon the fuel within the transient range from a variation over time in a pressure buildup and a pressure release, respectively, using input quantities of the first and second pressures acting upon the fuel, a delivery volume of the delivery pump and a volume of the pressure chamber.

5. The method according to claim 4, further comprising the step of:

determining the pressure acting upon the fuel within the transient range as a function of a pressure release caused by a fuel mass injected from the pressure chamber into the combustion chamber.

6. The method according to claim 1, further comprising the step of:

adjusting the working point of the internal combustion engine to the actual pressure acting upon the fuel within the transient range by varying at least one combustion-related parameter.

7. The method according to claim 1, further comprising the step of:

adjusting the working point of the internal combustion engine to the actual pressure acting upon the fuel in the pressure chamber within the transient range as a function of an injection geometry, the injection geometry being dependent on the actual pressure acting upon the fuel.

8. A control element for a control unit of an internal combustion engine, the control element storing a program that can run on a computing unit, the program being suitable for carrying out the steps of:

using a delivery pump, delivering a fuel to a pressure chamber to build up a pressure acting upon the fuel;

determining the pressure acting upon the fuel in the pressure chamber within a transient range, the transient range being between a first pressure acting upon the fuel in the pressure chamber and a second pressure acting upon the fuel in the pressure chamber;

injecting the fuel by at least one injection valve from the pressure chamber directly into a combustion chamber of the internal combustion engine as a function of the determined pressure; and adjusting a working point of the internal combustion engine upon a transition from the first pressure to the second pressure as a function of the determined pressure.

9. The control element according to claim 8, wherein the control element includes a read-only memory arrangement.

10. The control element according to claim 8, wherein a motor vehicle includes the internal combustion engine.

11. The control element according to claim 8, wherein the computing unit includes a microprocessor.

12. A control unit for an internal combustion engine having a pressure chamber, comprising:

a processor arrangement calculating an actual pressure acting upon a fuel within a transient range between a first working point of at least two working points and a second working point of the at least two working points, wherein the pressure chamber receives the fuel which is placed under a pressure by a delivery pump, the fuel being injected directly into a combustion chamber of the internal combustion engine by an injection valve from the pressure chamber, the pressure chamber including a pressure sensor measuring an actual pressure acting upon the fuel in the pressure chamber, the internal combustion engine operating within the transient range between the at least two working points that switch from a first pressure acting upon the fuel to a second pressure acting upon the fuel; and a control arrangement adjusting a working point of the internal combustion engine to the actual pressure acting upon the fuel.

13. The control unit according to claim 12, wherein a motor vehicle includes the internal combustion engine.

14. The control unit according to claim 12, wherein the actual pressure acting upon the fuel within the transient range is determined by the processor arrangement as a function of a model calculation from a variation over time in a pressure buildup and a pressure release, respectively, using input quantities of the first and second pressures, a delivery volume of the delivery pump and a volume of the pressure chamber.

15. The control unit according to claim 12, wherein the control arrangement includes an adjusting arrangement varying at least one combustion-related parameter.

16. An internal combustion engine, comprising:

a delivery pump;

a pressure chamber receiving a fuel which is placed under a pressure by the delivery pump, the pressure chamber including a pressure sensor measuring an actual pressure acting upon the fuel in the pressure chamber, the internal combustion engine operating within a transient range between at least two working points that switch from a first pressure acting upon the fuel to a second pressure acting, upon the fuel;

an injection valve;

a combustion chamber, the fuel being injected directly into the combustion chamber by the injection valve from the pressure chamber;

a processor arrangement calculating the actual pressure acting upon the fuel within the transient range between a first working point of the at least two working points and a second working point of the at least two working points; and a control arrangement adjusting a working point of the internal combustion engine as a function of the actual pressure acting upon the fuel.

17. The internal combustion engine according to claim 16, wherein the engine is a motor vehicle engine.

\* \* \* \* \*